J. L. CREVELING.
ELECTRIC SWITCH.
APPLICATION FILED DEC. 29, 1911.
1,149,735.
Patented Aug. 10, 1915.
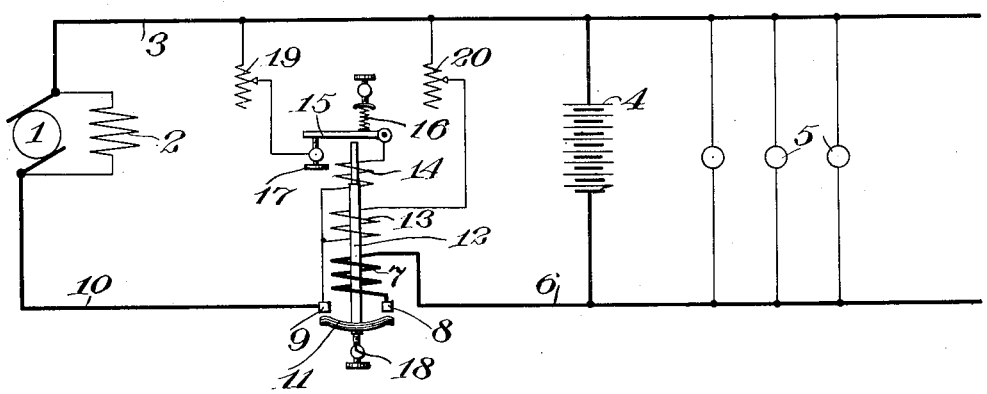
WITNESSES
Anna M. Wall
M. Herckovitz
INVENTOR
John L. Creveling

UNITED STATES PATENT OFFICE.

JOHN L. CREVELING, OF NEW YORK, N. Y., ASSIGNOR TO SAFETY CAR HEATING AND LIGHTING COMPANY, A CORPORATION OF NEW JERSEY.

ELECTRIC SWITCH.

1,149,735.   Specification of Letters Patent.   Patented Aug. 10, 1915.

Application filed December 29, 1911. Serial No. 668,502.

*To all whom it may concern:*

Be it known that I, JOHN L. CREVELING, a resident of New York, in the county and State of New York, have invented certain new and useful Improvements in Electric Switches, as set forth in the annexed specification and drawing, forming a part thereof.

My invention pertains to that type of electric switches adapted to automatically close and open an electric circuit under predetermined conditions.

As my switch is particularly applicable to electric systems wherein a generator is used to charge storage batteries and operate lamps or other translating devices, it will be described with reference to such a system.

The drawing is a diagrammatic representation of a system comprehending my invention.

In the drawing 1 represents a dynamo or generator provided with the usual field coil 2. The positive lead 3 is carried from the generator to one side of the storage battery 4 and lamps or other translating devices indicated at 5. Return from the battery and translating devices is made through the wire 6 having in series therewith a coil 7 connected with one terminal 8 of my improved switch, the opposite terminal 9 of which is connected as by the lead 10 with the generator.

11 represents a flexible contacting member adapted to complete the circuit between the contacts 8 and 9 and is carried by the core of magnetic material 12 surrounded by the fine coil 13 in shunt across the generator as indicated and by the coil 14 in shunt across the generator through the lever 15 normally pressed in a downward direction into contact with the contact member 17 by the adjustable spring 16 as indicated.

18 is an adjustable stop for adjusting the motion that may be given to the core 12 and contact member 11 in opening the switch.

19 and 20 represent adjustable resistances which may be placed in series with the coils 14 and 13 for the purpose of adjustment.

An operation of my invention is substantially as follows: If the generator be at rest the switch will be open and current may be supplied to the translating devices by the battery but will not flow back through the generator owing to the contact 8—11—9 being broken. If the generator now be operated, current will flow through coil 13 and coil 14 in shunt to the generator and I so wind these coils that they assist each other. If the generator voltage be now raised to substantially that of the battery, or to that point at which it is desired that the switch shall close, I so adjust the relation of the core 12 to the windings by proportioning the distance that the core shall have to be raised by means of the adjustable screw 18 and so adjust the current in the coils 13 and 14 that when this voltage is reached, the said coils will lift the plunger 12 and close the circuit between the generator and the battery. The coil 7 is so wound that current flowing from the generator through the battery and translating devices and returning through the coil 7 will assist the coil 13 in holding the switch closed and the lever 15 is so arranged with regard to the plunger 12 and so adjusted by means of screw 17 that, as the switch closes the main circuit, it opens the contact between 15 and 17 and thus breaks the circuit through the coil 14 and withdraws the assistance of this coil to the coil 13 which assistance was useful in performing the work of closing the switch. Therefore, by properly adjusting the current in the coils 13 and 14 by means of the resistances 20 and 19, and by properly adjusting the contact screw 17 and the traveling distance of the core 12 and member 11 by means of the screw 18, I cause the switch to close at a given voltage across the coils 13 and 14 and then reduce the magneto motive force tending to hold the switch closed in response to voltage fluctuations across the generator which is assisted by the current in the coil 7 supplied by the generator in such manner that cessation of current in or an extremely small back discharge through the coil 7 will cause the switch to open and then the coil 14 will again be thrown in circuit so as to assist in the work of closing the switch in case the generator voltage reaches that point necessary to close the same.

It will be obvious to one skilled in the art that in this manner I produce a switch which may be made to open and close by proper adjustment of the current in the coils 13 and 14, within a very narrow margin in either direction—that is, the switch may be made to close at a given voltage and to open at very nearly the same voltage, the coil 14 being alive when the work of closing the switch is to be done and dead after the work is performed.

I do not wish in any way to limit myself to the exact details or mode of operation set forth in this specification and drawing, for it will be obvious that wide departure may be made in the way of details without departing from the spirit and scope of my invention which is as set forth in the following claims:

1. An electric switch adapted to close a circuit, comprising a winding in said circuit, a core member adapted to be acted upon by the energy of said winding when the circuit is closed, a plurality of windings connected across said circuit and also arranged to act upon the core member, and a mechanical switch, inserted in the circuit of one of said windings, arranged in the path of the core and adapted to be operated by the latter when the main circuit is closed.

2. An electric switch adapted to close a circuit, comprising a winding in said circuit, a core member adapted to be acted upon by the winding when energized, a plurality of windings across said circuit, a mechanical switch inserted in the circuit of one of said windings, yielding means normally holding the mechanical switch in a closed position, and means for adjusting the tension of the said yielding means, said mechanical switch being arranged in the path of the before mentioned core member so as to be operated thereby and moved into an open position against the action of the yielding means when the main circuit is closed and the before mentioned winding thereof is energized.

3. The combination with a generator, a storage battery, and a supply circuit, of automatic means for controlling said circuit, comprising a plurality of coils in shunt to said circuit, a coil in series with said circuit, a movable switch member adapted to be acted upon by all or selected ones of the coils, and means actuated by the said movable member for cutting off the current from one of the shunt coils when the circuit is closed and the coil in series with the circuit is thereby energized.

4. The combination with a generator, a storage battery, and a supply circuit, of automatic means for controlling said circuit comprising a plurality of coils in shunt to said circuit; a core; a switch arranged in coöperative relation to said core; and a coil in series with said circuit and adapted to operate said core, whereby the switch may be opened at a predetermined voltage, and closed at subsantially the same voltage.

5. The combination with a generator, a storage battery and a supply circuit; of automatic means for controlling said circuit comprising a plurality of coils arranged in shunt to and in series with said circuit; two coöperating switches under control of said coils, the coils and switches being arranged so that some of the coils will assist each other in closing one of the switches and opening the other, and some of the coils will assist each other in opening one of the switches and closing the other.

6. The combination with a generator, a storage battery and a supply circuit; of automatic means for controlling said circuit comprising a plurality of coils in shunt to and in series with said circuit; a switch under control of said coils so as to be opened and closed thereby; a second switch, in the circuit of one of the coils, also under control of said coils; and means whereby when one switch is closed the other is opened, and vice versa.

7. The combination with a generator, a storage battery, and a supply circuit; of automatic means for controlling said circuit comprising a plurality of coils in shunt to the circuit; a core; a switch arranged in coöperative relation to said core; and means in series with said circuit adapted to operate said core and said switch, whereby the latter may be opened at a predetermined voltage and closed at substantially the same voltage.

JOHN L. CREVELING.

Witnesses:
CHAS. McC. CHAPMAN,
ANNA M. WALL.